United States Patent van Zuthem et al.

[11] Patent Number: 6,109,662
[45] Date of Patent: Aug. 29, 2000

[54] FLEXIBLE PIPE JOINT AND METHOD OF INSTALLING UNDERWATER PIPES

[75] Inventors: Eric van Zuthem, Charlestown, Mass.; Meije DeBoer, Alphen, Netherlands; Steve A. Walton, St. Petersburg, Fla.

[73] Assignee: Misener Marine Construction, Inc., Tampa, Fla.

[21] Appl. No.: 09/188,511

[22] Filed: Nov. 9, 1998

[51] Int. Cl.[7] .................................................. F16L 27/04
[52] U.S. Cl. ..................... 285/146.2; 285/24; 285/288.1; 285/325; 285/323; 405/170
[58] Field of Search ............... 285/146.1, 146.2, 285/146.3, FOR 148, FOR 149, 373, 419, 325, 261, 24, 25, 26, 27, 28, 29, 147.1, 288.1; 405/170

[56] References Cited

U.S. PATENT DOCUMENTS

| | | | |
|---|---|---|---|
| 122,614 | 1/1872 | Kearney | 285/373 |
| 1,782,484 | 11/1930 | Spencer et al. | |
| 2,067,428 | 1/1937 | Wallis | 285/193 |
| 2,175,712 | 10/1939 | Westermayer | 285/92 |
| 2,219,752 | 10/1940 | Rohr | 285/92 |
| 2,329,369 | 9/1943 | Haver | 285/11 |
| 2,474,431 | 6/1949 | Lipman et al. | 285/129 |
| 2,556,659 | 6/1951 | Patterson | 285/261 |
| 2,689,752 | 9/1954 | Webster | 285/94 |
| 3,658,366 | 4/1972 | Welch et al. | 285/24 |
| 3,695,644 | 10/1972 | Goldberg | 285/233 |
| 3,733,092 | 5/1973 | Yorke | 285/261 |
| 3,938,833 | 2/1976 | Miyaoka | 285/166 |
| 4,018,979 | 4/1977 | Young | 285/373 |
| 5,133,578 | 7/1992 | Whightsil, Sr. et al. | 285/166 |
| 5,288,110 | 2/1994 | Allread | 285/166 |

*Primary Examiner*—Dave W. Arola
*Attorney, Agent, or Firm*—Dennis G. LaPointe; Mason & Assoc., P.A.

[57] ABSTRACT

A flexible pipe joint for use with pipes installed on the ocean bottom comprising two pipes having adjacent ends shaped in the form of a ball wherein each ball-shaped end includes a tubular round pipe and a convex-shaped ring with a spherical cross-section fixed to the outer surface of the pipe end. The ring has a watertight welded seal between the rings edges and the round pipe outer surface. The flexible pipe joint further comprises a dual coupling including an upper and a lower part, the parts have inner surfaces of spherical-cross sections which conform to the outer surface of the rings. The dual coupling is fastened with eyebolts to complete the make-up of the flexible pipe joint.

An improved method of installing underwater pipes using flexible pipe joints comprising tack welding the lower part of the dual coupling to one end of the pipe to be lowered to the ocean bottom and using releasable vertical steering pins, funnel-shaped steering channels, guide lines and buoys to guide a second pipe into a joining position with a first lowered pipe, then completing the make-up of the improved flexible joint.

19 Claims, 7 Drawing Sheets

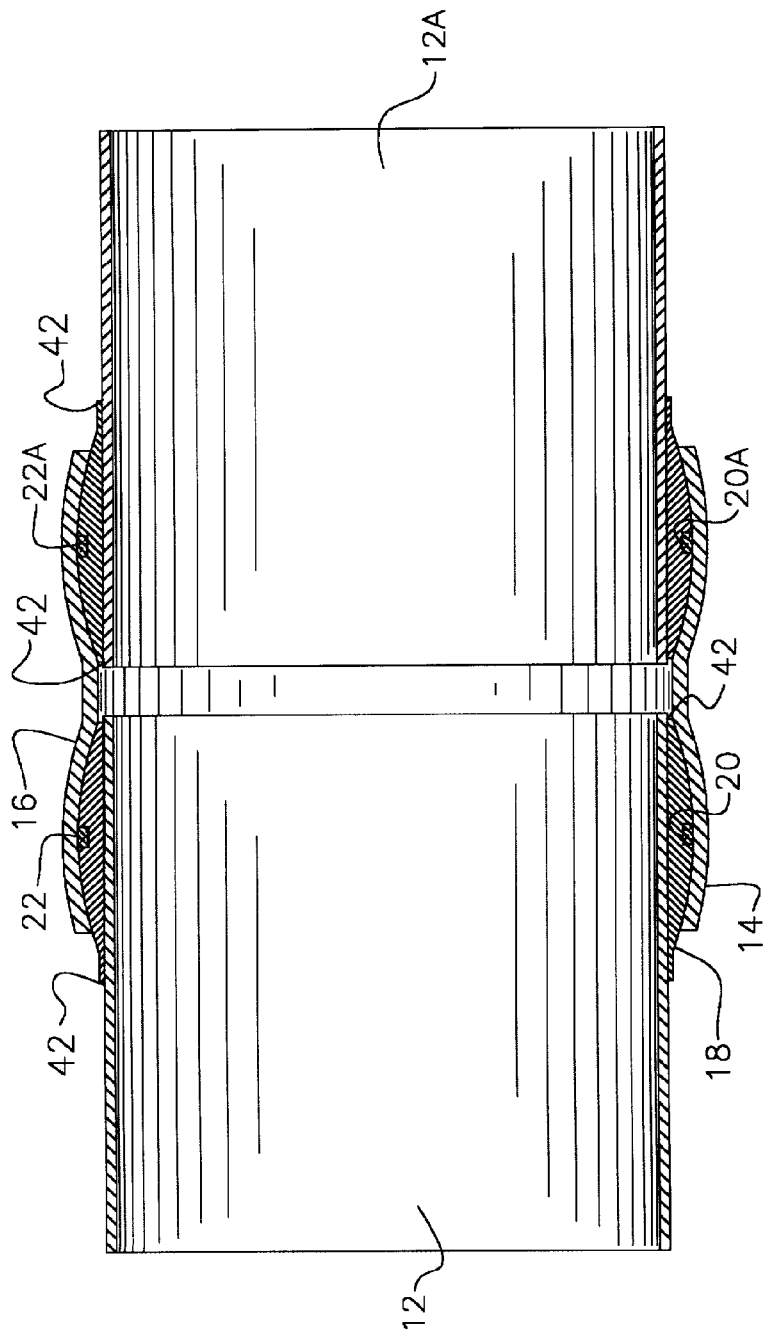
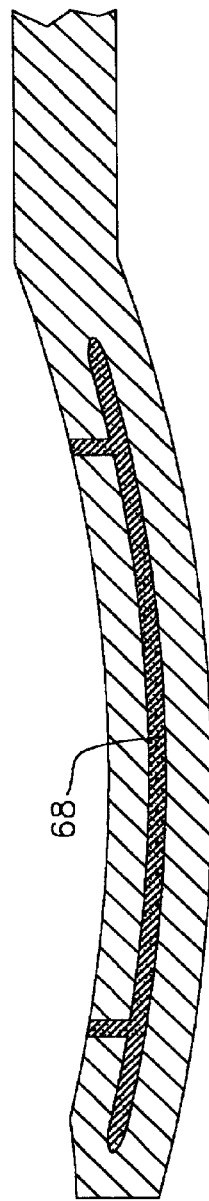

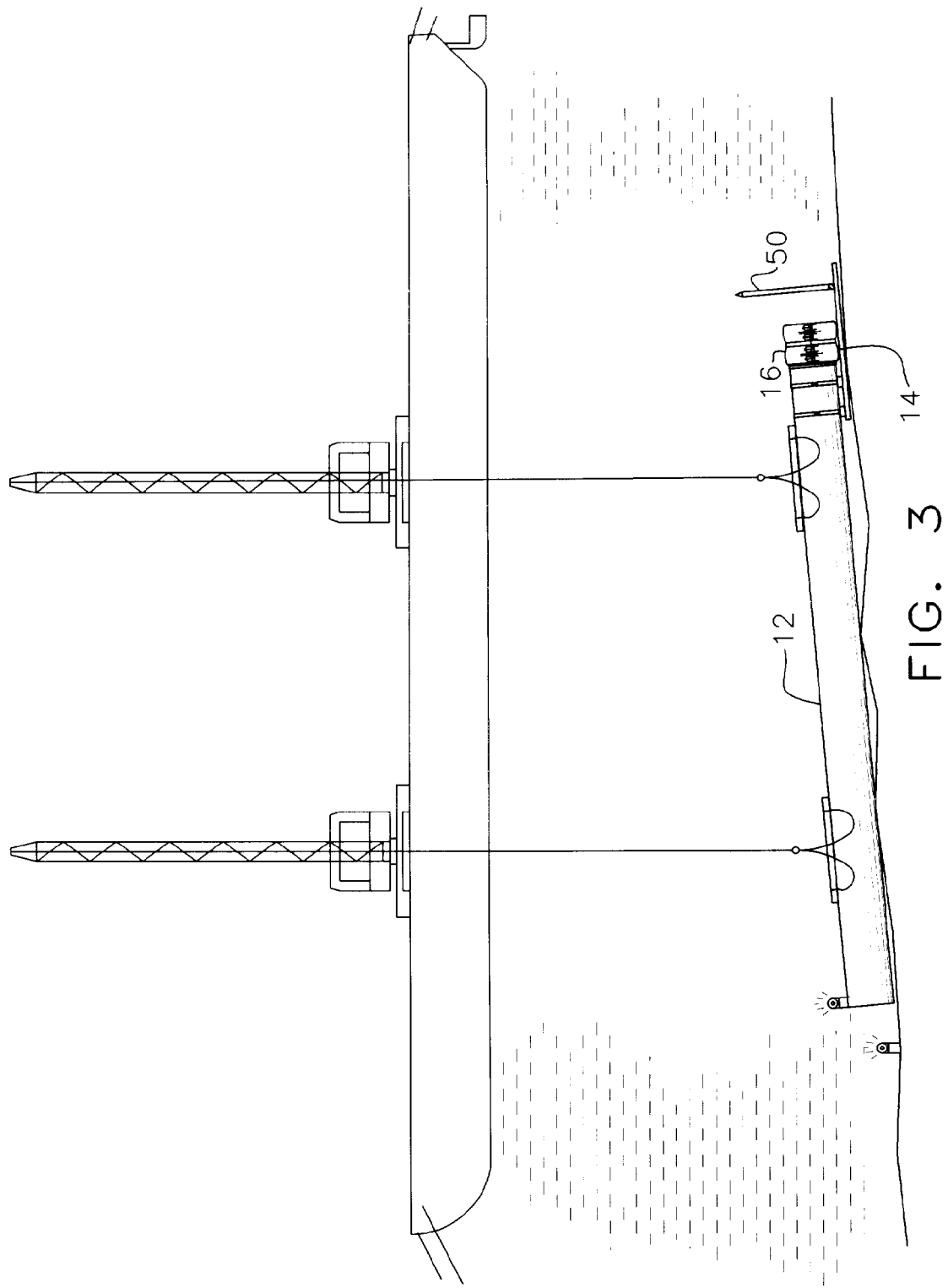

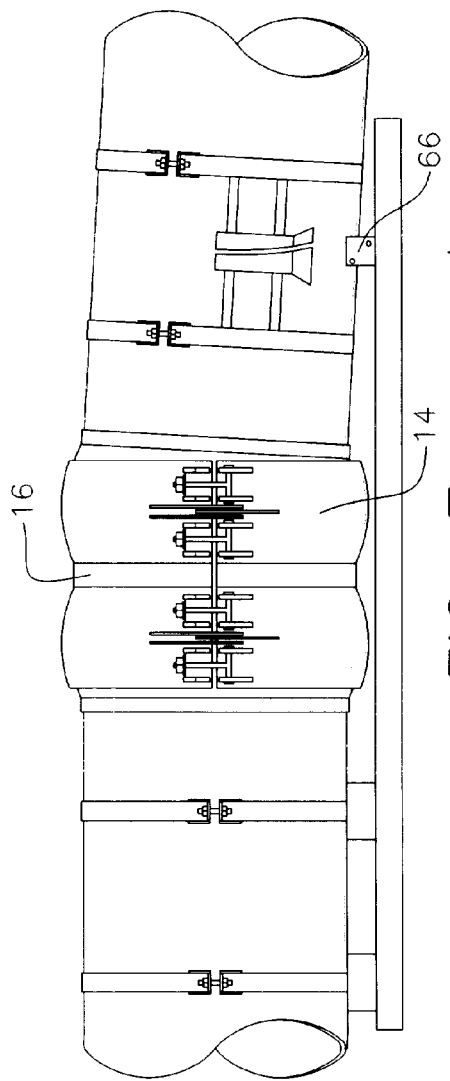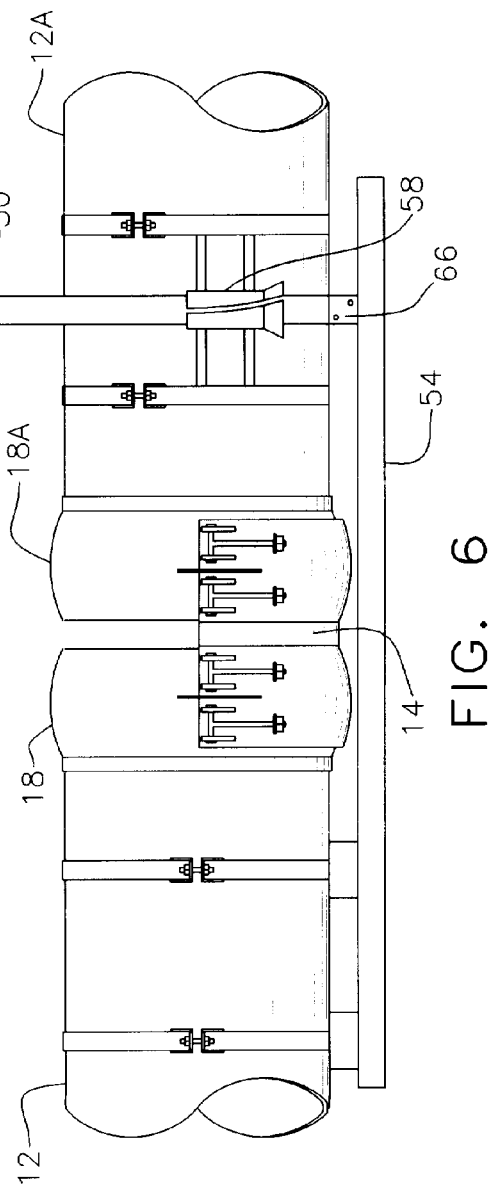

FLEXIBLE PIPE JOINT AND METHOD OF INSTALLING UNDERWATER PIPES

BACKGROUND OF THE INVENTION

1. Field of Invention

This invention relates to improvements in a large diameter flexible pipe joints and methods of installation of underwater pipes on the ocean floor.

2. Description of Related Art

It is well known in the art to shape the ends of pipes to balls and to connect the spherical ends by a socket having inner spherical surfaces so that a point flexible in all directions is formed.

These kinds of couplings are commonly used in the dredging industry for the connections of floating pipelines. In general, one pipe is provided with a male end or ball joint and the adjacent fitting pipe end is provided with a female end or spherical socket. There have been some attempts to provide pipes with ball joint ends which are joined together with a socket coupling. U.S. Pat. No. 2,175,712 to (Westermayer) is a sheetmetal overlapping joint whereby the ends of the pipe are expanded to form the ball and a sheetmetal coupling overlaps the balls to form the joint. This is not a watertight joint suitable for installation in deep water and withstanding lateral forces commonly found on the ocean floor. Other known related art include U.S. Pat. No. 1,782,484 to Spencer et al.; U.S. Pat. No. 2,689,752 to Webster, and U.S. Pat. No. 2,474,431 to Lipman et al. Such related art incorporates flares or expansion of pipe ends with bolting and clamping means not suitable for large diameter, for example, 36 inches to 60 inches, underwater pipes nor are they suitable for underwater installation of such pipes. Further, flared connections are generally rigid connections and do not provide the ability to rotate and change pipe direction without the use of special interconnecting fittings.

SUMMARY OF THE INVENTION

Therefore it is an object of this invention to provide a improved flexible ball and socket joint for large diameter pipes and a further object to provide an improved method of installation of such pipes in deep water ranging in depth up to 400 feet. The improved joint is able to withstand lateral forces up to 380 tons. These pipes may have an internal operating pressure of up to 50 psi, and in some instances 100 psi or higher.

The present invention includes a convex-shaped ring with a spherical cross-section which is fillet welded to the ends of tubular round pipes to form a male ball joint end at each end of the pipe, the fillet welds forming a watertight seal between the pipe and ring. The ring is generally machined to form the spherical cross-section. A groove is included circumferentially around the apex of the ring for receiving a gasket material, generally a rubber O-ring.

The present invention further includes a dual coupling which comprises an upper part and a lower part. The parts have machined inner surfaces of spherical cross-section which conform to the shape of the rings. The coupling may be hinged on one side with slideably engageable means for ease and convenience in aligning the upper and lower parts of the dual coupling, thereby connecting mating ends of an upper and lower part to allow clamping the upper and lower parts over the adjacent pipes with ball joint ends.

Each opposing edge of the lower part of the dual coupling includes a groove generally following the arc of the coupling with grooved extensions toward the inner surface of the lower coupling part juxtaposed the end of the groove following the arc of the coupling. A rubber gasket, generally made from neoprene, is placed in the groove for sealing engagement with the mating edge of the upper part of the dual coupling.

Tightness can be achieved by the use of a plurality of eyebolts, generally four eyebolts, on each side of the dual coupling, secured between protrusion forming a boss on the lower part to hold the eyebolts in place. The eyebolts are then swung into a slot on the upper part of the coupling, the slot formed by protruding flanges. The upper surface of the flanges has a flat area to serve as a bearing surface for tightening a nut and washer combination. Another embodiment includes eyebolt tightening means on both sides of the coupling without the hinged connection. A further embodiment would include two eyebolts on each side of the dual coupling, each eyebolt radially aligned with an O-ring gasket around the circumference of the convex-shaped ring.

The present invention also includes an improved method of installing underwater pipes incorporating the improved flexible pipe joint. The preferred embodiment of the improved method includes the steps of providing a convex-shaped ring with a spherical cross-section on an outer surface of each end of the pipes to be installed underwater; machining a groove circumferentially around the apex of each ring to receive a gasket; fillet welding each ring to the outer surface of the ends of each pipe; installing the gasket materials in each groove; and tack welding the lower part of a dual coupling to one end of each of the pipes to be installed underwater. The prepared pipes are placed on a crane barge. When the barge is in position to install the pipes underwater, installation can proceed using the improved method which further includes providing a pair of vertical steering pins which are releasably attached to positioning means attached to a first pipe to be lowered underwater, providing funnel-shaped steering devices at the downstream end of pipes to be lowered on the ocean bottom; fixing a guide line on each upper most end of the vertical steering pins and attaching a buoy to each opposite end of the guide lines, the guide lines being of sufficient length to pull the buoys underneath the surface of the water as the pipe is being lowered to the ocean bottom, thereby tightening the guidelines in a vertical relationship; connecting the steering devices to each guide line at an intermediate location between the steering pins and the buoys; lowering a first pipe on the ocean bottom with the tack welded dual coupling; lowering a second pipe, guiding the second pipe into position with the vertical steering pins, steering devices and taut guide lines, whereby the steering devices are directed to the vertical pins and the ring of the pipe being lowered is then placed into the socket-shaped bottom part of the dual coupling; placing the upper part of the dual coupling over the ends of the adjacent first and second pipes; fastening the dual coupling together to provide a watertight pipe joint; and releasing the vertical steering pins, the buoys floating the vertical steering pins and guide lines to the surface for reinstallation on subsequent pipes to be lowered to the ocean bottom.

There are other important objects, features and advantages of the invention that will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 2 is a cross-sectional view of the improved pipe joint depicting the rings and dual coupling.

FIG. 3 is a perspective view depicting a typical installation of the first pipe on the ocean bottom.

FIG. 6 is a perspective view depicting a second pipe placed in position within the lower part of the dual coupling utilizing the improved installation method.

FIG. 7 is a perspective view depicting the made-up pipe joint completed using the improved installation method.

FIG. 9 is a perspective view depicting the groove for receipt of a gasket on the edge of the lower part of the dual coupling.

DETAILED DESCRIPTION OF THE INVENTION

Figure 1:
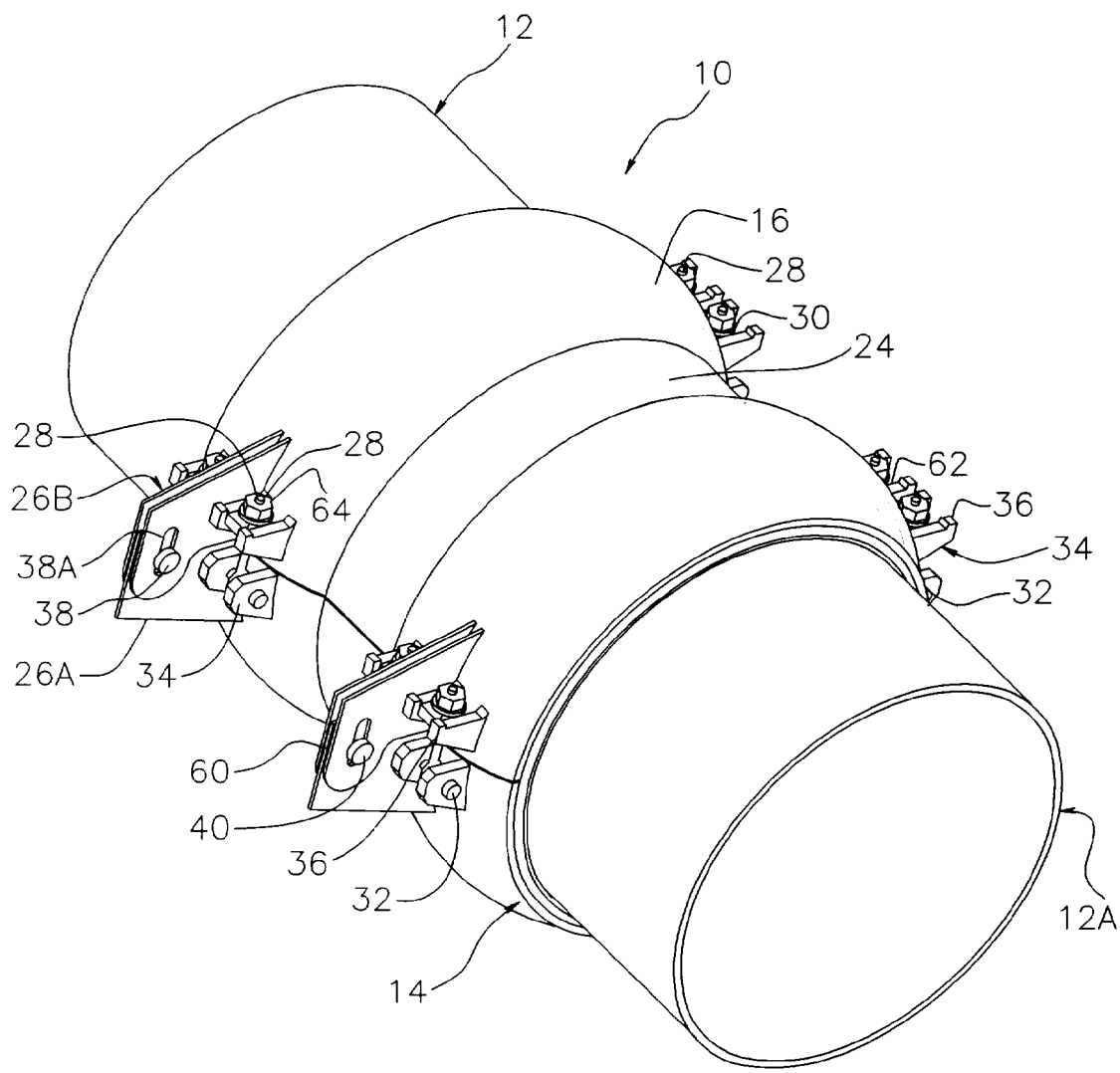
FIG. 1 is a perspective view of the improved flexible pipe joint.

This invention comprises an improved flexible pipe joint and an improved method of installing large diameter underwater pipes on the ocean bottom. Referring to FIGS. 1 and 2, two opposing ends of pipes 12 and 12A are joined together with a dual coupling 24 forming a flexible pipe joint 10.

As shown on FIG. 2, a machined convex-shaped ring with a spherical cross-section 18, 18A welded to the outer surface of a tubular round pipe 12, 12A to form a watertight seal between the pipe outer surface 12, 12A and the ring 18, 18A. The dual coupling 24 is comprised of an upper part 16 and a lower part 14, the parts having inner surfaces of spherical cross-section which conform to the surface of the rings 18, 18A.

A preferred embodiment of the present invention includes a pair of hinged connections 60 for ease in joining and clamping the upper and lower coupling parts, 16 and 14 respectively, the hinged connections 60 being on a first lateral side of the pipes 12, 12A being joined. The hinged connections 60 further include slideably engageable means 38, typically a slot 38A in the upper hinge 26B is engaged by a hinge pin 40 inserted through upper and lower hinges 26A and 26B, the hinge pin 40 being fixed to the lower hinge 26A and capable of traveling within the hinge slot 38 in a vertical motion for adjusting the alignment of the upper and lower parts, 16 and 14, of dual coupling 24. Although the hinged connections 60 are a preferred embodiment of the present invention, an alternative embodiment would not include such connections. In this alternative embodiment, the upper coupling part 16 would initially be separated physically from the lower coupling part 14 and subsequently manually placed on the pipe ends and joined with its mating lower coupling part 14.

A further embodiment of the present invention includes a machined groove 20, 20A located circumferentially around the apex of the convex-shaped rings 18 for receipt of a gasket material 22. The gasket material is generally a rubber O-ring. The rubber O-ring may be neoprene; although other resilient materials resistant to salt water deterioration known in the art may be used. The lower part of the dual coupling 14 includes a machined groove 68 on each opposing edge, the groove being located within the edge and configured in an arc shape generally conforming to the shape of the coupling, the groove further extending inwardly at two locations, each juxtaposed the end of the groove following the arc of the coupling. A rubber gasket 70, generally neoprene rubber, is placed in the groove 68 for sealing engagement with the mating edges of the upper part of the dual coupling 16. The gasket material may be made from other resilient materials resistant to salt water deterioration known in the art.

Figure 8:
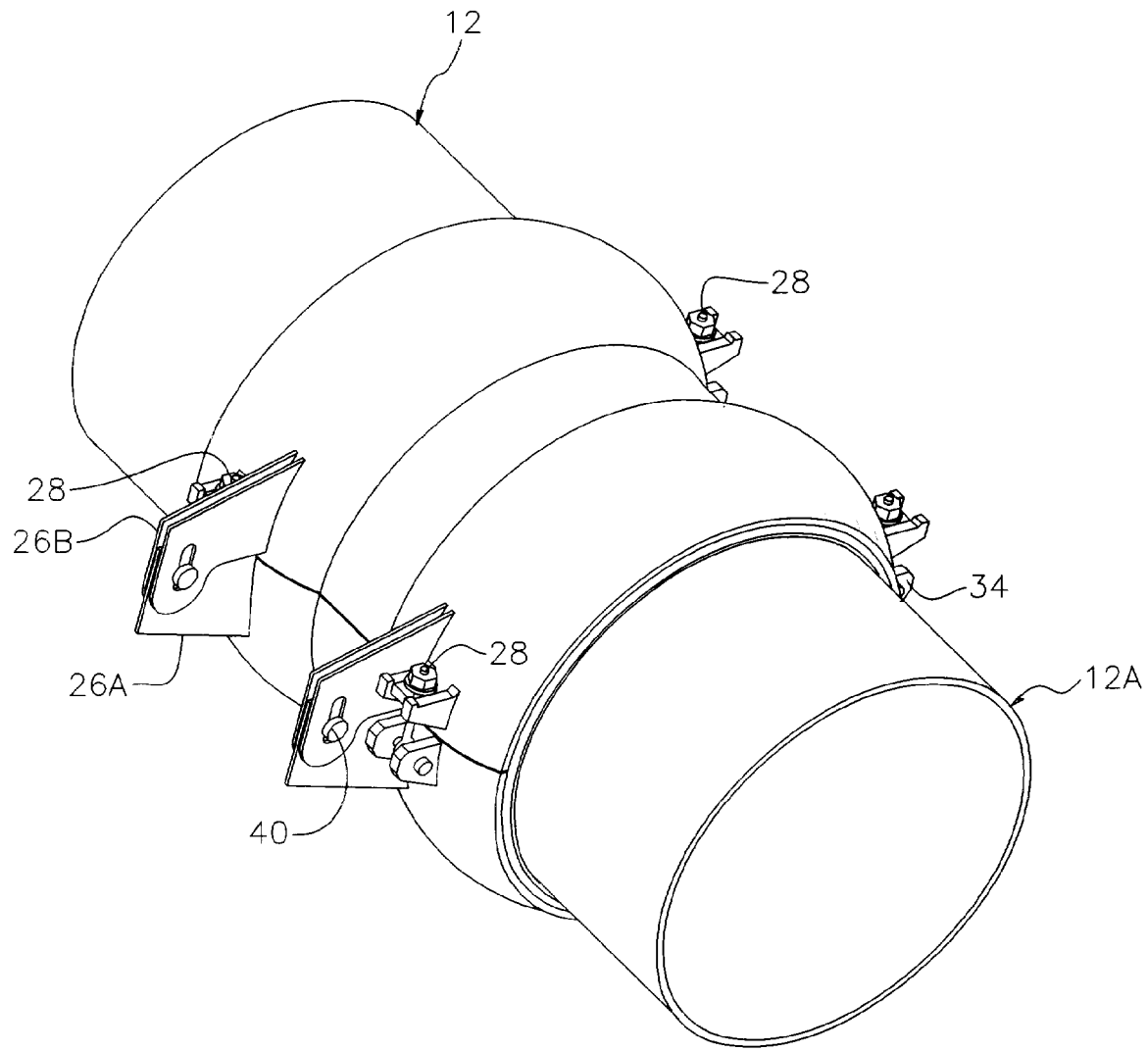
FIG. 8 is a perspective view depicting the made-up pipe joint using two eyebolts on each side of the dual coupling instead of four eyebolts.

A further embodiment of the present invention includes securing means 30 for tightening the upper part 16 and the lower part 14 of the dual coupling 24 together thus forming the pipe joint 10. The securing means comprises a plurality of pairs of protruding eyebolt bosses 34, generally four pairs for both lateral sides of the dual coupling 24, each pair of bosses 34 further including a rotatable threaded eyebolt 28 mounted between the bosses 34, the eyebolts being fixed to the coupling lower part 14 with a pin 32 fastening the eyebolt 28 within the bosses 34. The securing means 30 further include a plurality of pairs of protruding eyebolt flanges 36, generally four pairs for both lateral sides of the dual coupling 24, each pair of flanges 36 forming an eyebolt slot 62 therebetween to rotate and receive the eyebolt 28. The threaded portion of eyebolt 28 extends above an upper bearing surface of each pair of eyebolt flanges 36 for threadedly engaging and tightening a nut and washer combination 64. An alternative embodiment is depicted in FIG. 8 where two eyebolts are used instead of four on each side of the dual coupling 24. The eyebolts in this embodiment are generally radially aligned to the circumference of the O-ring gasket 22 in the groove 20 within the convex-shaped ring. The eyebolts may preferably be constructed of Nitronic® 50 (Registered trademark of Armco, Inc.) which is an austenitic stainless steel of the chromium-nickel-manganese type (200 Series), fortified with molybdenum and nitrogen.

Another object of the present invention is to provide an improved method of installing large diameter pipe underwater to the ocean bottom using the embodiments of the improved pipe joint described above. FIGS. 3–7 depict this new and improved innovative method. The pipes 12 are first prepared with the rings 18, grooves 20, and gaskets 22 as depicted in FIG. 2. The lower part 14 of the dual coupling 24 is tack welded to one end of the pipe 12. A positioning means 54 is attached to a first pipe 12 at the end where the lower part 14 is tack welded. A pair of vertical steering pins 50 are releasably attached to the positioning means 54 at a space-apart relationship to receive a mating second pipe 12A.

On one end of each subsequent pipe 12A to be lowered to the ocean bottom, a pair of funnel-shaped steering channels 58 are provided on opposite lateral sides of each pipe 12A. The funnel-shaped steering channels 58 are located adjacent to the ring 18 but at a distance from the ring edge so as not to interfere with the dual coupling 24.

Figure 4:
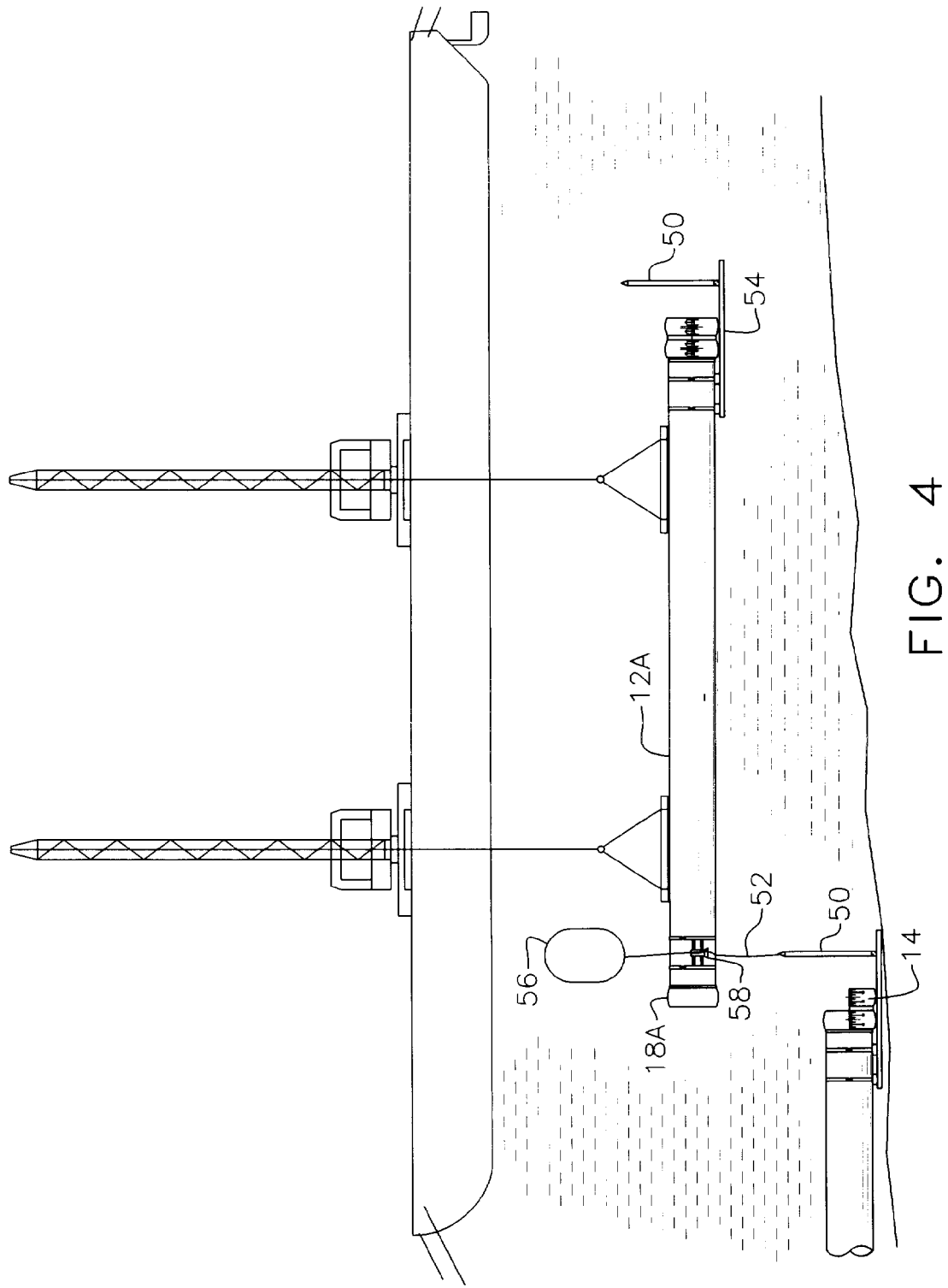
FIG. 4 is a perspective view depicting the improved installation method with a second pipe being guided into position to be joined with the first pipe.
Figure 5:
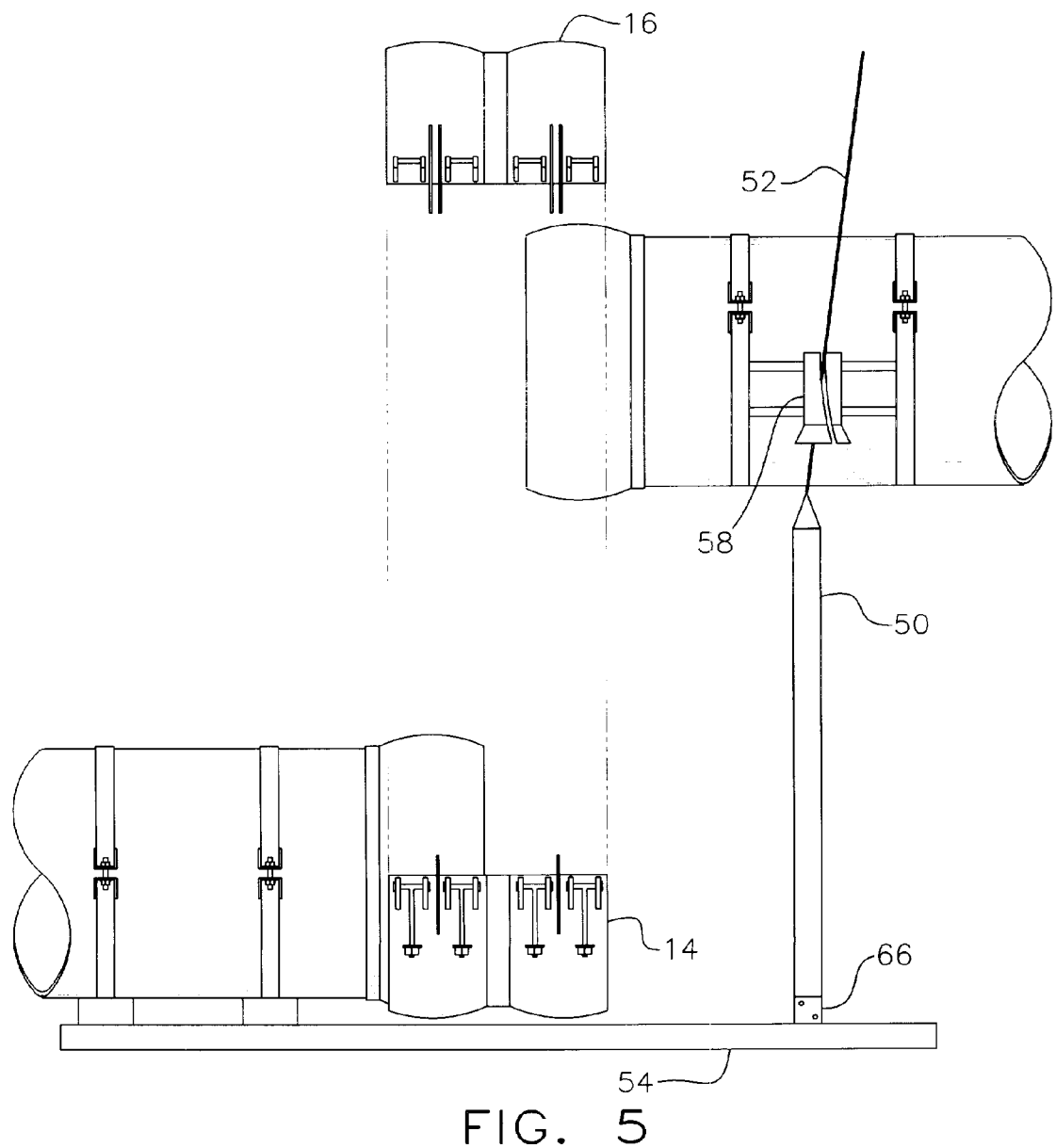
FIG. 5 is a perspective view depicting a second pipe being guided into position in accordance with the improved method.

A guide line 52 is fixed at each end of the vertical steering pins 50, the opposite end of the guide lines 52 being attached to buoys 56. The guide lines 52 are of sufficient length such that the buoys 56 will be forced underneath the surface of the water, thereby tightening the guide lines in a vertical relationship when the pipe 12 is placed on the ocean bottom. As shown in FIGS. 4–5, the guide lines 52 are connected with the steering channels 58 at an intermediate location between the steering pins 50 and the buoys 56.

After the first pipe is lowered to the ocean bottom as depicted in FIGS. 3–4, a second pipe is guided into position between the vertical steering pins 50 as shown in FIGS. 5–6.

The ring 18A on pipe 12A is lowered into the spherical-shaped lower part 14 of the dual coupling 24. The upper part 16 of the dual coupling 24 is then placed over the rings 18, 18A on the adjacent pipes 12, 12A. The dual coupling 24 upper and lower parts, 16 and 14, are then fastened together by tightening the eyebolt nut and washer combinations 64 to the eyebolts 28.

The vertical steering pins 50 are then released as depicted in FIG. 7 by removing post release pins 66. The buoys 56 float to the surface so the crew can retrieve the guidelines 52 and vertical steering pins 50 for reuse on subsequent pipes to be installed on the ocean bottom.

This invention is clearly new and useful. Moreover, it was not obvious to those of ordinary skill in this art at the time it was made, in view of the prior art considered as a whole as required by law.

It will thus be seen that the objects set forth above, and those made apparent form the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A flexible pipe joint comprising:

two pipes having adjacent ends shaped in the form of a ball wherein each ball-shaped end includes a tubular round pipe and a convex-shaped ring with a spherical cross-section, the ring being fixed to the pipe outer surface proximate the end of the pipe, the ring further having a watertight seal between the ring and tubular round pipe;

a dual coupling, the coupling further comprising an upper part and a lower part, the parts having inner surfaces of spherical cross-section which conform to the outer surface of the rings;

the dual coupling further comprising a pair of hinged connections for joining and clamping the upper and lower coupling parts, the hinged connections being on a first lateral side of the pipes being joined and the hinged connections further having slideably engageable means for adjusting the alignment of the upper and lower parts of the dual coupling;

the dual coupling further including means for securing together mating ends of upper and lower coupling parts to the first lateral side and at a second lateral side of the pipes being joined;

the rings further including sealing means circumferentially around the proximate apex of the ring for sealing engagement with the inner surface of the dual coupling; and the dual coupling lower part further including sealing means in the opposing edges of the lower part for sealing engagement with the mating edges of the upper part of the dual coupling.

2. The flexible pipe joint of claim 1 wherein the sealing means in the rings is a groove machined circumferentially around the proximate apex of the ring for receiving a gasket, the gasket being in sealing engagement with the clamped dual coupling.

3. The flexible pipe joint of claim 2 wherein the gasket is an O-ring.

4. The flexible pipe joint of claim 1, wherein the means for securing together each mating end of the upper and lower coupling parts comprise:

a plurality of pairs of protruding eyebolt bosses on the lower coupling part with a rotatable threaded eyebolt mounted between each pair of eyebolt bosses, the eyebolt being fixed to the coupling lower part with a pin fastening the eyebolt within each pair of protruding eyebolt bosses; and a plurality of pairs of protruding eyebolt flanges on the upper coupling part aligned with each pair of protruding eyebolt bosses on the lower coupling part, each pair of eyebolt flanges forming a slot therebetween to rotate and receive the eyebolt, the eyebolt threaded portion extending above an upper bearing surface on each pair of eyebolt flanges for threadedly engaging and tightening a nut and washer combination to the eyebolt.

5. The flexible pipe joint of claim 4 wherein the plurality of pairs of protruding eyebolt bosses number four pairs on each lateral side and the plurality of pairs of protruding eyebolt flanges number four pairs on each lateral side.

6. The flexible pipe joint of claim 4 wherein the plurality of pairs of protruding eyebolt bosses number two pairs on each lateral side and the plurality of pairs of protruding eyebolt flanges number two pairs on each lateral side.

7. The flexible pipe joint of claim 1, wherein the watertight seal between the ring and tubular round pipe is a fillet weld along the ring edge.

8. The flexible pipe joint of claim 1 wherein the sealing means in the opposing edges of the lower part of the dual coupling is a machined groove within each arc portion of the edges of the lower part of the dual coupling, the groove generally conforming to the shape of each arc formed by the dual coupling, the groove further including a groove extension juxtaposed the ends of the arc-shaped groove and extending toward the inner surface of the dual coupling, the groove for receiving a second gasket, the second gasket being in sealing engagement with a mating edge of the upper part of the dual coupling.

9. The flexible pipe joint of claim 1 wherein the diameter of the pipes range from 36 inches to 60 inches.

10. A flexible pipe joint comprising:

two pipes having adjacent ends shaped in the form of a ball wherein each ball-shaped end includes a tubular round pipe and a convex-shaped ring with a spherical cross-section, the ring being fixed to the pipe outer surface proximate the end of the pipe, the ring further having a watertight seal between the ring and tubular round pipe;

a dual coupling, the coupling further comprising an upper part and a lower part, the parts having inner surfaces of spherical cross-section which conform to the outer surface of the rings;

the dual coupling further including means for securing together the mating ends of upper and lower coupling parts at lateral sides of the pipes being joined;

the rings further including sealing means circumferentially around the proximate apex of the ring for sealing engagement with the inner surface of the dual coupling; and the dual coupling lower part further including sealing means in the opposing edges of the lower part for sealing engagement with the mating edges of the upper part of the dual coupling.

11. The flexible pipe joint of claim 10 wherein the sealing means in the rings is a groove machined circumferentially around the proximate apex of the ring for receiving a gasket, the gasket being in sealing engagement with the clamped dual coupling.

12. The flexible pipe joint of claim 11 wherein the gasket is an O-ring.

13. The flexible pipe joint of claim 10 wherein the sealing means in the opposing edges of the lower part of the dual coupling is a machined groove within each arc portion of the edges of the lower part of the dual coupling, the groove generally conforming to the shape of each arc formed by the dual coupling, the groove further including a groove extension juxtaposed the ends of the arc-shaped groove and extending toward the inner surface of the dual coupling, the groove for receiving a second gasket, the second gasket being in sealing engagement with a mating edge of the upper part of the dual coupling.

14. The flexible pipe joint of claim 10 wherein wherein the diameter of the pipes range from 36 inches to 60 inches.

15. The flexible pipe joint of claim 10, wherein the means for securing together each mating end of the upper and lower coupling parts comprise:

a plurality of pairs of protruding eyebolt bosses on the lower coupling part with a rotatable threaded eyebolt mounted between each pair of eyebolt bosses, the eyebolt being fixed to the coupling lower part with a pin fastening the eyebolt within each pair of protruding eyebolt bosses; and a plurality of pairs of protruding eyebolt flanges on the upper coupling part aligned with each pair of protruding eyebolt bosses on the lower coupling part, each pair of eyebolt flanges forming a slot therebetween to rotate and receive the eyebolt, the eyebolt threaded portion extending above an upper bearing surface on each pair of eyebolt flanges for threadedly engaging and tightening a nut and washer combination to the eyebolt.

16. The flexible pipe joint of claim 15, wherein the plurality of pairs of protruding eyebolt bosses number four pairs on each lateral side and the plurality of pairs of protruding eyebolt flanges number four pairs on each lateral side.

17. The flexible pipe joint of claim 15, wherein the plurality of pairs of protruding eyebolt bosses number two pairs on each lateral side and the plurality of pairs of protruding eyebolt flanges number two pairs on each lateral side.

18. The flexible pipe joint of claim 10, wherein the watertight seal between the ring and tubular round pipe is a fillet weld along the ring edges.

19. A method of installing underwater pipes using flexible pipe joints comprising the steps of:

providing a convex-shaped ring with a spherical cross-section on an outer surface of each end of a plurality of pipes to be installed underwater;

providing a groove circumferentially around the apex of each ring to receive a gasket;

fillet welding each ring to the outer surface of the pipes to provide a watertight seam between the ring and the pipe outer surface;

providing a dual coupling having an upper part and a lower part with each end of each part being arc shaped;

providing a groove generally conforming to the shape of each arc of a lower part of a dual coupling, the groove extending toward the inner surface of the dual coupling near the ends of each arc-shaped groove;

installing gaskets within the grooved edges of the lower part of the dual coupling;

installing gaskets in each groove on each ring;

tack welding the lower part of the dual coupling to an upstream end of each of the plurality of pipes to be installed underwater, wherein the dual coupling arc shaped ends include inner surfaces of spherical cross-section which conform to the outer surface of the rings, and wherein one side of the dual coupling lower part is engaged with the ring prior to tack welding the dual coupling lower part in place;

providing a pair of vertical steering pins releasably attached to positioning means attached to a first pipe, the steering pins being spaced-apart to receive a mating second pipe therebetween;

providing funnel-shaped steering channels at the downstream end of pipes to be lowered on the ocean bottom, the steering channels being located on opposite sides of each pipe and adjacent the ring seam welded to each pipe while allowing sufficient clearance to allow the clamping of the dual coupling together without interference;

fixing a guide line on each uppermost end of the vertical steering pins and attaching a buoy to each opposite end of the guide lines, the length of the guide lines being sufficient to force the attached buoys underneath the water surface as the pipe is being lowered to the ocean bottom, thereby tightening the guide lines in a vertical relationship;

connecting the steering channels to each guide line at an intermediate location between the steering pins and the buoys;

lowering a first pipe on the ocean bottom with the tack welded dual coupling on the upstream end;

lowering a second pipe, guiding the second pipe into position with the vertical steering pins, steering channels and taut guide lines, whereby the steering channels are directed to the vertical pins and the ring of the pipe being lowered is then placed into the spherical-shaped lower part of the dual coupling;

placing the upper part of the dual coupling over the ends of the adjacent first and second pipes;

fastening the dual coupling together to provide a watertight pipe joint; and releasing the vertical steering pins, the buoys floating the vertical steering pins and guide lines to the surface for reinstallation on subsequent pipes to be lowered to the ocean bottom.

* * * * *

UNITED STATES PATENT AND TRADEMARK OFFICE
CERTIFICATE OF CORRECTION

PATENT NO. : 6,109,662
DATED : August 29, 2000
INVENTOR(S) : Eric van Zuthem, et al.

It is certified that error appears in the above-identified patent and that said Letters Patent is hereby corrected as shown below:

Col. 3, line 36
 replace "welded to"
 with --welded 42 to--.

Signed and Sealed this

Twenty-fourth Day of April, 2001

Attest:

NICHOLAS P. GODICI

Attesting Officer     Acting Director of the United States Patent and Trademark Office